Dec. 8, 1964 H. E. BENNETT 3,160,752
REFLECTOMETER FOR MEASURING SURFACE FINISHES
Filed Feb. 19, 1963 2 Sheets-Sheet 1

*INVENTOR.*
HAROLD E. BENNETT
BY
*P. H. First*
ATTORNEY.

United States Patent Office 3,160,752
Patented Dec. 8, 1964

3,160,752
REFLECTOMETER FOR MEASURING
SURFACE FINISHES
Harold E. Bennett, China Lake, Calif., assignor to the United States of America as represented by the Secretary of the Navy
Filed Feb. 19, 1963, Ser. No. 259,761
13 Claims. (Cl. 250—83.3)
(Granted under Title 35, U.S. Code (1952), sec. 266)

The invention herein described may be manufactured and used by or for the Government of the United States of America for governmental purposes without the payment of any royalties thereon or therefor.

This invention relates generally to optical measuring devices and more particularly to an optical measuring device for measuring the surface roughness of manufactured objects.

Requirements for accuracy in providing surface finishes are becoming more and more common in machine shop practice. For example, where there are to be running surfaces, which must be closely fit, lubricating films for separating these surfaces are often limited to only a very few micro-inches in thickness. Such dimensions may be found, for example, in the microminiature bearings and shafts for gyroscopes. Additionally, it is to be noted that the surface finish for such diverse devices as powder extrusion dies, plastic molds, refrigerator seals, packing rings, vacuum pump parts, and memory drums for high speed computers, to list only a few examples, is often deemed critical.

Although reliable methods for measuring surface roughness in the 20 to 125 micro-inch range have been in use for some time, no method in use today allows one to easily, accurately, and in a non-destructive manner, measure surface roughness in the 0.4 to 10 micro-inch range. As a result, surface finishes are often determined by trial and error. For example, when working with a given powder die, the die may be set up and tried to see if powder piles up in it. Also, in practice, attempts have been made to determine proper surface characteristics by making statistical studies which predict that by using certain production techniques, a certain fraction of the tested objects will have an operative life shorter than that which would normally be expected.

The method most commonly used, at present, to accurately measure surface roughness involves moving the tip of a stylus across a rough test surface and recording vertical motion imparted to the stylus tip. This method offers good results for machined metal surfaces having a R.M.S. (root mean square) surface roughness of greater than 10 to 20 micro-inches.

Unfortunately, however, the use of a stylus has not been found to be very satisfactory when working with "supersmooth" surfaces, i.e. those having an R.M.S. roughness below 10 micro-inches. A superficial reason is that this method is a destructive method, since, in practice, a scratch is left on the test surface due to the stylus tip being moved thereacross. A more fundamental inadequacy, however, is that the tip of the stylus may not penetrate to the bottom of a depression appearing on the surface of a test object, due to the relative size of the stylus tip when compared to the depression. A stylus tip having a small radius of curvature may be here utilized, conceivably, but it would tend to be extremely fragile, and more importantly, the yield strength of the material to be tested would in most cases be exceeded thus preventing the stylus tip from contouring the surface thereby rendering the measured roughness value meaningless. These effects become more significant as the radius of the tip is made smaller. Therefore, it is desirable that some other method be utilized for testing surface roughness of "super smooth" test surfaces.

In most instances, it is necessary that tests for surface roughness be non-destructive. Consequently, the appearance of machined metal surfaces, supplemented by a fingernail test, is perhaps most commonly used to estimate surface roughness. An experienced machinist, if he knows which of the many and varied operations were used to machine a piece of work, and if he is familiar with the characteristics of the metal alloy, or other material, can estimate the surface roughness fairly accurately. Such a method, for obvious reasons, cannot be extensively relied on when uniformity of determination becomes critical. Attempts have been made to utilize visual determination on an assembling quantity basis by utilizing standard test surfaces for ground, turned, milled, and shaped steel surfaces. These standard test surfaces have surface roughness ranging from two to 500 micro-inches, and can be compared visually with given test surfaces. Although the known visual methods for determining surface roughness provide useful techniques, this use is limited, since two surfaces, each having an idential surface roughness, may be prepared by different machining operations or from different compositions and may, therefore, have completely different surface roughness appearances.

To improve on known visual methods, various photometric methods have been suggested for determining surface roughness from reflectance measurements in the visual regions of the spectrum. The results achieved have been disappointing because the specular reflectance of most metal surfaces in the visual regions results not only from surface roughness, but also from the shape of the irregularities forming the surface roughness. Until recently, the reasons for this lack of success in empirically relating reflectance measurements made in the visual region of the spectrum to the surface roughness of machined metal surface was not clear, since no comprehensive theory existed for relating the reflectance of a rough surface to its surface finish. Such a theory has, recently, been suggested by Drs. H. E. Bennett and J. O. Porteus, at pp. 123–129, vol. 51 of The Journal of Optical Society of America (1961), indicating that there exists a possibility for uniquely determining surface roughness from reflectance measurements made in the infrared regions of the spectrum.

Certain optical methods for determining surface finish ultilizing various projection and comparison methods have been used in the past. Among these methods the most successful and accurate found for measuring the surface roughness for "super smooth" surfaces have employed interferometry. Although two-beam interference methods are nearly always used, multiple beam interferometry has definite advantages and will doubtless be more widely used as the industry becomes more familiar with this technique. When using interferometry measurments, it is possible to obtain detailed point by point information about the shape and height of individual surface irregularities in the .1 to 10 micro-inch range. However, frequently it is not desirable to determine individual surface irregularities, but instead it is desirable to determine and to specify the given surface statistically, for example, to determine and classify the measurement of the R.M.S. value of surface roughness.

A technique capable of providing such information is a technique known as a Reflectance Method. This technique provides a large number of advantages, among which are: it can be used to measure surface roughness within the range of from .4 micro-inch to 10 micro-inches or more; it is non-destructive; it may be designed for use by relatively unskilled personnel; measurements can be made rapidly and accurately and will be in error by less than 10%, as compared to the several hundred percent error present when utilizing stylus type instruments now operating in this region; statistical information about the R.M.S. slope of the surface irregularities, and about the surface height distribution function, can be obtained; and, if this technique is used in conjunction with interferometry techniques, it is possible to completely specify the test surface. The Reflectance Method is based on a result of refraction, which is concerned with behavior of light impinging or striking an object whose surface irregularities are small relative to the wavelength of the impinging light, as will hereinafter become more clearly understood.

Therefore, the general purpose of the present invention is to provide an instrument which utilizes the Reflectance Method technique for measuring the surface roughness in a manner which eliminates the aforementioned disadvantages, while providing for increased accuracy and efficiency.

An object of the present invention is to provide a simplified apparatus for making surface roughness measurements.

Another object is to provide an instrument capable of measuring surface roughness of flat or plane surfaces, as well as convex or concave surfaces, such as spheres and cylinders.

A further object is to provide an instrument for determining and classifying the surface roughness of varied surfaces.

And still a further object is to provide a means for effecting a rapid evaluation of surface roughness for test surfaces.

Other objects, advantages and novel features of the invention will become apparent from the following detailed description of the invention when considered in conjunction with the drawings wherein:

FIG. 1 comprises a schematic view of a reflectometer of the present invention;

Figure 5:
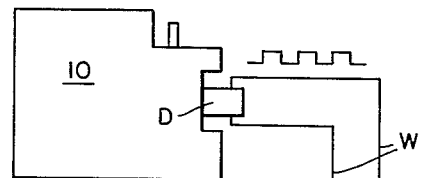
Figure 3:
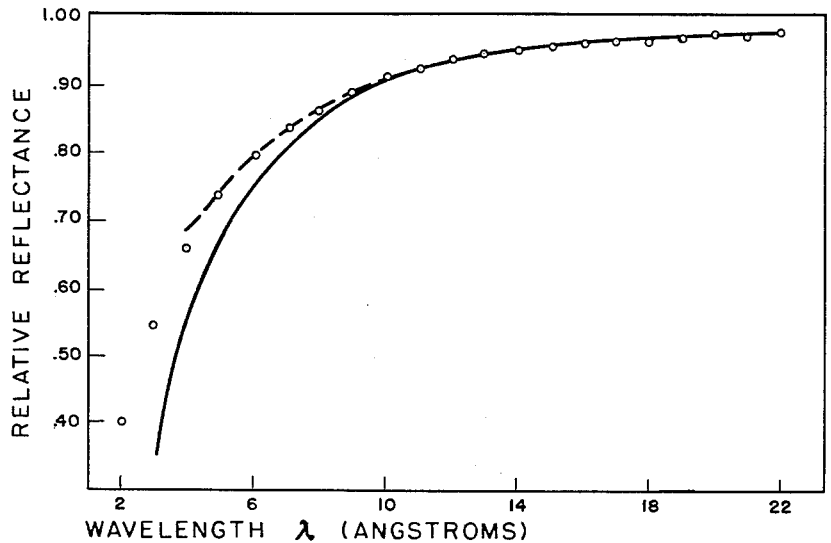
Figure 4:
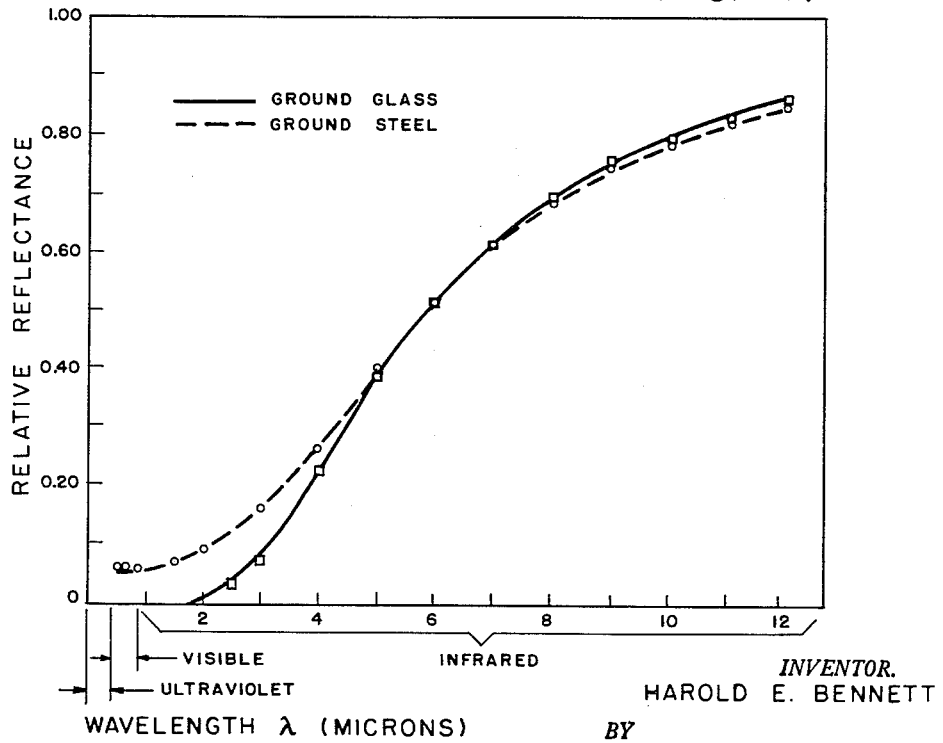

FIGS. 3 and 4 comprise graphic views illustrating certain reflectance characteristics utilized by the present invention; and FIG. 5 is a schematic view, in block form, illustrating arrangements of certain components as provided for in the present invention.

Figure 1:
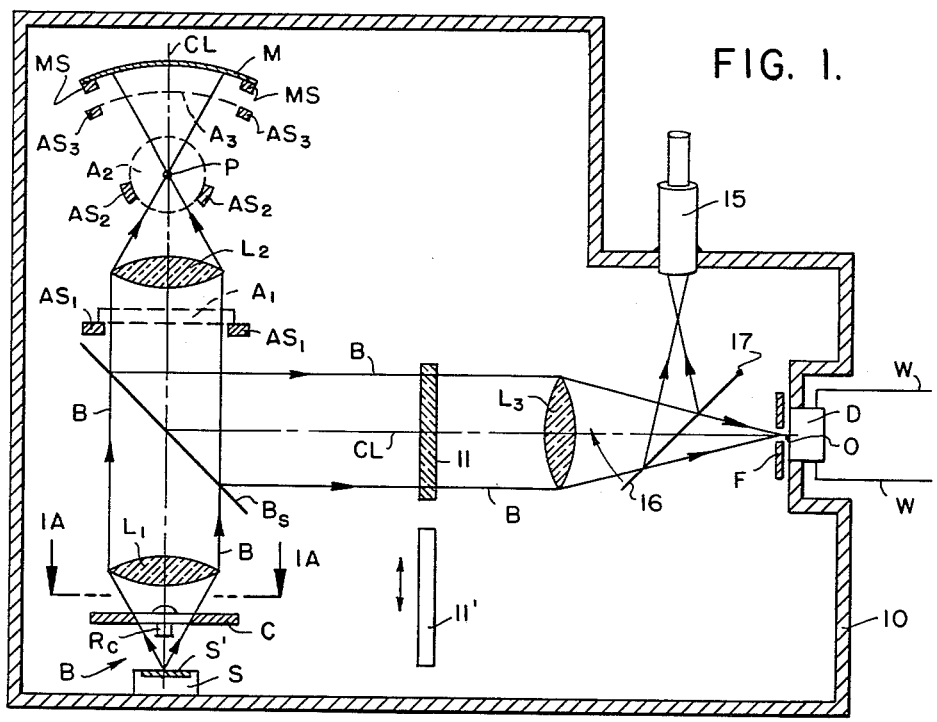
FIG. 1A is a partial plan view taken generally along lines 1A—1A of FIG. 1.
Figure 1A:
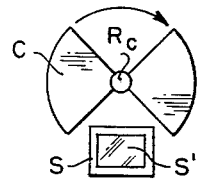

Referring now more specifically to the drawings, wherein like reference characters designate like or corresponding parts throughout the several views, there is shown in FIG. 1, which illustrates an embodiment of the present invention, a reflectometer having a housing 10. The housing 10 serves to house various components and structural members utilized in the instant device, and serves as a basic support therefor. Within the housing 10 there is provided a number of suitable mounting members, not shown, secured to the housing 10 in a manner for providing means mounting and supporting the components therein in a manner well within the purview of one skilled in the art. Therefore, the hereinafter described elements are to be assumed to be mounted and interconnected by suitable means within the housing 10.

The basic structure of the present invention provides means disposed adjacent the bottom of the housing 10 forming an infrared light beam generating point source S, which may comprise a zirconium arc generator having a window S' for emitting generated infrared light beams B. Arranged above the window S' is a rotatable light chopper C which serves to interrupt or break the beams B into a plurality of sequential pulses as the chopper C is caused to be rotated, by suitable means Rc, within the path of the beams to alternately pass and block the beams B. Directly above the chopper C, there is positioned a collimating lens $L_1$, which collimates the pulsed beams B as they pass from the chopper, and a beam splitter $B_s$ so arranged as to pass the collimated beams as they egress along a predetermined path from the collimating lens $L_1$. Arranged in "stacked" fashion above the beam splitter $B_s$, and at opposite sides of the beam's path, there is a plurality of pairs of test object mounting devices $AS_1$, $AS_2$ and $AS_3$, which may be arranged to assume a configuration of rails or tracks for convenience in locating within said path test objects $A_1$ and $A_3$, which are illustrated by dotted lines, and $A_2$, shown in solid lines, in FIG. 1. Surmounting the stacked mounting means $AS_1$, $AS_2$ and $AS_3$, there is a mirror support MS for mounting a downwardly disposed concaved mirror M, the purpose of which will hereinafter become more clearly understood.

Adjacent the beam splitter $B_s$, a beam focusing lens $L_3$ is disposed in light receiving fashion with respect to the beam reflecting surface of the beam splitter. The function of the lens $L_3$ and the reflecting surface of the beam splitter is to direct and focus beams B upon a suitable detector D as the beams are reflected from the beam splitter $B_s$. The beam splitter serves to first direct the pulsed beams B from the collimating lens $L_1$ along a path towards the surface of a test object, mounted on a given object support, from which they are reflected back towards the reflecting surface of the beam splitter $B_s$. A beam detector D is mounted in a suitable fashion adjacent an opening within the housing 10 and is preceded by a field stop F having an adjustable orifice O through which the beams B are directed, by the lens $L_3$, to impinge on the detector.

It is to be particularly understood that each lens, light passing and light responsive components, of the instant invention, must be of a type which will accommodate a light beam having a wavelength within the infrared region of the spectrum. For example, the lens and beam splitter utilized herein may be of a well known type formed from a compound utilizing $CaF_2$ (calcium fluoride), while the detector D may comprise a unit commonly referred to as a thermistor bolometer, being also of well known design, which is capable of providing pulsed electrical output signals indicative of the magnitude of the pulsed beams B impinging thereon.

In order to provide for a more thorough understanding of the reflectometer of the present invention, the basic components of which have hereinbefore been set forth, it is necessary to provide a more thorough description of the hereinbefore mentioned Reflectance Method.

Figure 2:
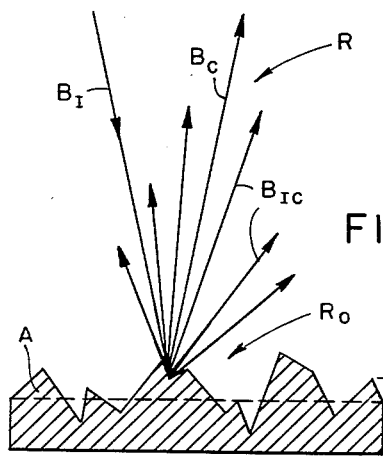
FIG. 2 is a diagrammatic view illustrating dispersal of incident light beams reflecting from a rough test surface.

Turning now to FIG. 2 of the drawings, there is shown an incident beam $B_I$ impinging upon a rough surface of an object A with the total reflectivity of the surface being designated $R_0$. In general, $R_0$ will be different for metals of different compositions and for different wavelengths of the light incident upon a given type of metal. If the surface were perfectly "smooth" and flat like a mirror, all of the reflected light would be specularly reflected and would follow a path as a coherent beam $B_c$, FIG. 2, to provide coherently reflected light, which is designated R. However, if the surfaces were rough some of the light would be diffusely reflected, as indicated by incoherent beam $B_{ic}$, and the surface of the object would then appear dull. Whether the surface looks shiny, like a mirror, or appears dull is determined by a ratio of the magnitude of the R.M.S. surface roughness $\sigma$ to the wavelength $\lambda$ of the light incident upon the surface, and by the R.M.S. slope $m$ of the surface irregularities. However, if the R.M.S. height of the irregularities is very small compared to the wavelength, the slope becomes unimportant and the fraction of light which is spectrally or coherently reflected will depend on the ratio of $\sigma/\lambda$. The fraction of light which is coherently reflected may be designated $R/R_0$, the relative specular reflectance. Under general conditions, this relative specular reflectance $R/R_0$ is given by the theoretical equation $$\frac{R}{R_0} = e^{-(4\pi\sigma/\lambda)^2} + 32\pi^4(\sigma/\lambda)^4(\Delta\theta/m)^2$$

where $\Delta\theta$ is the half angle of acceptance of the optical system which collects the reflected beams. Therefore, the Reflectance Method for measuring different surface roughness can be simply stated. First, one measures the reflectance of a rough surface using an instrument with a narrow acceptance angle. Measurement is made at a long enough wavelength so that the contribution from the incoherent term of the above equation, i.e.

$$32\pi^4(\sigma/\lambda)^4(\Delta\theta/m)^2$$

is negligible. The reflectance from a very "smooth" piece of the same material is then measured at the same wavelength. From a ratio of the reflectivity established between values of the rough and the smooth surfaces the value of the R.M.S. roughness is determined.

To check the validity of the expression $R/R_0$, a series of relative reflectance measurements may be made on various surfaces in visible and infrared regions of the spectrum. This measurement may be obtained by means of an instrument such as that disclosed in applicant's copending application Serial No. 78,791, filed December 27, 1960, since it is capable of measuring either relative or absolute spectral reflectance over a wavelength range from 3,000 angstroms in the ultarviolet to 30 microns in the infrared range, or over a wavelength interval of 100 times greater than that which can be observed visually. Reflectance measurements, with this device, are made with an accuracy of .1% in most cases, or at least ten times better than that which is possible when using any commercially available reflectometer.

A graph, as shown in FIG. 3, illustrates the result of a typical set of relative reflectance measurements made on a rough surface. The circles and dotted line represent experimental points on a curve obtained with the aforementioned device, while the solid line is in the calculated relative reflectance curve, assuming there is no contribution from the incoherent term $32\pi^4(\sigma/\lambda)^4(\Delta\theta/m)^2$ in the equation for $R/R_0$, and where $\sigma/\lambda$ is much less than 1. The two curves coincide for values of the relative reflectance $R/R_0$ above .90, as depicted by the graph. As the relative reflectance decreases, the incoherent term of the expression becomes important and the experimental points diverge from the solid curve. For still smaller values of the relative reflectance, the requirement that $\sigma/\lambda$ be much less than 1 is no longer fulfilled and the theory in this simple form breaks down.

Turning now to FIG. 4, the graph shown therein illustrates the measured relative reflectance for an aluminized ground glass surface represented by solid line, and an aluminized ground steel surface, represented by a dotted line. The two surfaces have nearly the same R.M.S. roughness so that the two reflectance curves nearly coincide at longer wavelengths. However, at shorter wavelengths the relative reflectance of the ground glass surface decreases more rapidly than does the ground steel surface. For wavelengths shorter than two microns, reflectance of the ground glass surface is essentially zero. However, the ground steel surface exhibits an appreciable relative reflectance even in the visible region of the spectrum. It is to be understood that this behavior is caused through the ground glass having a very jagged surface, and hence the R.M.S. slope of the surface irregularities is very large. The contribution of the incoherent term in the equation of $R/R_0$ is thus negligible even for low relative reflectance values. However, the R.M.S. slope for the ground steel surface is about 5° as may be calculated from the equation for $R/R_0$. Consequently there is a contribution from the incoherent term for the steel surface and the reflectance does not go to zero. Incidentally, it is to be particularly noted that this example, additionally, serves to illustrate the versatility of the reflectance method for measuring surface roughness, since ground glass, such as that described, has such a jagged and irregular surface that determining the surface roughness with a profilomometer-type instrument would be virtually impossible.

The example also illustrates the reasons why an optical reflectance method for measuring surface roughness is not practicable if wavelengths in the visible region of the spectrum are used. All of the measured reflectance, in this example, from the ground steel surface in the visible region arises from the incoherent term in the equation for $R/R_0$. The reflectance in this region therefore depends not only on the value of the surface roughness, but also on the R.M.S. value of the slope. Hence, any change in the method of machining the surfaces, or any changes in the kind or composition of the metal, may result in a change in the R.M.S. value of the slope and hence a change in the reflectance value for a given roughness will be introduced.

Now turning back to FIG. 1 of the drawings, while not shown, it is understood that the housing 10 is provided with a plurality of suitable openings which permit necessary access to the interior thereof. Hence, when a flat surface of an object to be tested, such as that indicated by reference character $A_1$, is placed in the path of the beams B and supported by an object support $AS_1$, so that the light emitting from the source S can be reflected from the surface thereof, its relative reflectance can be determined by measuring the ratio of light reflected from the rough test surface to that reflected from a reference surface or flat, not shown, which may be placed in the beam in a like manner so that light beams may be reflected therefrom to impinge on the detector D.

It is often desirable to use two or more interference filters 11 and 11' which may alternately be interposed between the lens $L_3$ and the beam splitter $B_s$ for each test surface in order to correct for possible small difference in measured reflectance between the test surface and the reference surface introduced through variances in their operative positions. The function of these filters 11 and 11' may best be understood by observing the following condition. When the term $$\left(\frac{R}{R_0}\right)_1 = e^{-(4\pi\sigma/\lambda_1)^2}$$

comprises the true relative reflectance of the test surface at wavelength $\lambda_1$, and $$\left(\frac{R}{R_0}\right)_2$$

comprises the reflectance at wavelength $\lambda_2$ and the test and reference surfaces are not operatively positioned in the beam in exactly the same way, the observed relative reflectance will be $$\alpha\left(\frac{R}{R_0}\right)_1 \text{ at } \lambda_1$$

and $$\alpha\left(\frac{R}{R_0}\right)_2 \text{ at } \lambda_2$$

where $\alpha$ comprises a function of position. It is to be particularly noted that the term $\alpha$ is not a function of wavelength. If $\alpha$ is not known, the true value of $\sigma$ cannot be obtained from reflectance measurements at a single wavelength. However, if known data in the form of given wavelengths $\lambda_1$ and $\lambda_2$ are used, it is not necessary to know $\alpha$ since this term cancels and $\sigma$ may be determined from the equation:

$$\left[\alpha\left(\frac{R}{R_0}\right)_1\right]\left[\frac{1}{\alpha\left(\frac{R_0}{R}\right)_2}\right] = e^{-(4\pi\sigma)^2\left(\frac{1}{\lambda_1^2}-\frac{1}{\lambda_2^2}\right)}$$

The filters 11 and 11' are provided within the device and are mounted for alternate positioning by means of a suitable track, not shown, but which permit the filters to be moved selectively into the reflected beam from alternate sides of the center line CL, in order that reflectance measurements may be made at a first wavelength $\lambda_1$ and then at a second wavelength $\lambda_2$, so that any error that may occur as a result of the positioning of the test and reference surfaces may be avoided through a convenient and simple mechanical manipulation of the device. In using the filter system, a first value $V_1$ is established by providing a ratio between a given meter's output values for the reference surface and test surface at a desired wavelength value $\lambda_1$ provided for a first filter 11. A second value $V_2$ is then established by providing a ratio between the meter's output values for the reference surface and the test surface at a desired second wavelength value $\lambda_2$ which is provided for the filter 11'. Values $V_1$ and $V_2$ may then be multiplied together to derive a value which may then be compared to an established reference to provide a surface roughness factor.

After reflecting from the test reference surface, the light beams B pass through the interference filter 11 or 11' and are imaged by the lens $L_3$ on the field stop F, the orifice O of which is nearly filled by the image of the source S. The aperture opening or orifice O determines the acceptance angle of the instrument and hence controls the extent of the contribution of the incoherent term in the expression $R/R_c$. Light passing through the aperture strikes the detector D and causes the detector to generate an output A.C. (alternating current) signal indicative of the magnitude of the coherent beam $B_c$. Signals from the detector D are fed through conventional leads W, FIG. 5, in pulsed form to an amplifier 12, whereupon the signals are amplified and rectified to a D.C. (direct current) form and fed to a meter 14, which serves to accurately measure and indicate magnitude of the D.C. signal. The ratio of signals obtained from the reference surfaces and the test surface are then utilized to establish relative reflectance values for the test object being subjected to the light beams B having a wavelength within the infrared region of the spectrum.

While the description of the operation hereinabove set forth has been directed primarily to measuring the roughness of a flat surface, such as $A_1$ supported by $AS_1$, it is to be understood that the device is in no way limited to measuring flat surfaces, but on the contrary, the device serves quite satisfactorily for measuring or testing the surface roughness of spherical and cylindrical parts of objects. Testing the surface roughness of spherical or cylindrical parts requires a more sophisticated optical system than is necessary for testing the surfaces of the flat objects. It is understood that the reflectance theory requires that the impinging light beams B be incident to the surface of the object, an ordinarily difficult requirement when the surface is a curved one. One solution is to image the point source S at the center of the curvature of the test object, as indicated by the reference character P on the center line CL in FIG. 1. This may be achieved through a focusing lens $L_2$. The light is then specularly reflected at normal incidence by the surface of the sphere or cylinder. For example, when an object $A_2$, in the form of a cylinder, is supported by supports $AS_2$ the reference surface therefor will then be in the form of a cylindrical mirror M, the shape of which is dictated by the shape of the test object. The mirror M, supported by support means MS above the curved cylindrical test object $A_2$, may be coated with the same material as the surface of the test object and will receive and reflect the light beams B when the test object is removed from the path of the beams being emitted from the point source S. The detector's output signals generated by the pulsed beams being alternately reflected from the surface of the test object and from the reference surface will then provide the relative specular reflectance directly, in a manner similar to that previously described in conjunction with the description directed to the measuring of the flat surfaced object.

If the surface of the test object is concave, rather than convex, a different procedure may be used where desired. In this case the test object $A_3$, indicated in dotted lines may be substituted for, or placed in front of the curved reference mirror M. The procedure for testing the concave surface is then performed in the same manner as that described for testing the convex spherical or cylindrical surface of $A_2$. All that is necessary is that the center of curvature be made to coincide accurately with the image of the point source, formed by the focusing lens $L_2$ as may be provided for focusing the beams B. It is here to be particularly noted that the lens $L_2$ serves to focus the light beams B, passing from the lens $L_1$, onto the center of curvature of the test object or the mirror, whichever the case may be, and hence the shape thereof is directly dictated by the shape of the object being tested. For example, in the case described above, the lens $L_2$ is of the type known as a "cylindrical" lens. However, in the event that the surface of a spherical ball-shaped object is being tested a "spherical" lens and "spherical" mirror M must be used, since the mirror shape and the shape of the lens $L_2$ must be compatible with the shape of the object the surface of which is to be tested. It should also be pointed out that this optical system does not restrict the radius of curvature of the curved test object to one value. All values for the radius of curvature less than the focal length of the lens are theoretically possible. In practice, however, samples having radii of curvature very much smaller than the focal length should probably be avoided.

The use of the two interference filters 11 and 11' will be even more important when measuring the surface roughness of a curved surface, than it is for plane or flat surfaces. As described above, any error in the positioning of the surface will result in an error in the relative reflectance measurements; however, the same percentage of error will be made at each wavelength, so such error will not produce an error in the surface roughness determination.

In operation of the device of the present invention it is, for purposes of illustration, assumed that a cylindrical mirror M, which is utilized as reference surface, is arranged on the mirror support MS, and the cylindrical test object $A_2$ is positioned on the support $AS_2$ and a cylindrical lens $L_2$ is provided between the beam splitter $B_s$ and the cylindrical test object. The reading from the mirror or reference surface M has previously been taken at the meter 14. As light is generated at the point source S, it is caused to be directed towards the test object $A_2$. As the light beams pass from the point source S toward the object $A_2$ they are broken into a series of pulses by the chopper C and are directed to impinge upon a collimating lens $L_1$, which cause the light beams B to become parallel as they pass therethrough. After passing through the lens $L_1$ they are caused to impinge upon the beam splitter $B_s$ and are passed therethrough to the lens $L_2$, which then causes the beams to be focused on the surface of the test object $A_2$. The pulsed light beams B are then reflected back towards the beam splitter $B_s$ at the surface of which coherently reflected beams are reflected toward the interference filters and the focusing lens $L_3$. The beams are passed through interference filters 11 and 11', utilized for avoiding error introduced through the positioning of the surfaces from which the light has been reflected as hereinbefore described, so that such an error will not produce an error in the ultimate surface roughness determination. The coherently reflected light beams are now caused to be focused by the lens $L_3$ into the aperture or orifice O of the field stop F. As the pulsed light beams pass through the aperture O of the field stop F, they impinge upon the detector D to generate pulsed electrical signals. These signals are amplified by the amplifier 12 and directed towards the meter 14 to provide an output reading indicative of the magnitude of the coherently reflected portions of the pulsed light beams. The detector signals, generated by light being specularly reflected from the rough surface of the test object and the reference surface of the mirror, are then used to provide a ratio to indicate the relative reflectance values of the surface of the test object to determine its surface roughness.

It is here to be particularly noted that the size of the aperture O necessarily serves to determine the acceptance angle of the instrument and hence, serves to control the contribution of the incoherent term in the expression for $R/R_0$.

In practice, it may be desirable to provide a centering microscope 15 and a removable plane mirror 16, which are used to insure that the image of the point source S coincides when the test surface and the reference surfaces are alternately disposed within the beam. The mirror 16 is first pivoted at 17 to interpose itself in the path of the beams being reflected from the beam splitter $B_s$, whereby the operator may visually align the test object in order to provide for a desired positioning of the surface of the test object. Upon positioning the object, the mirror 16 is then removed so that light may be focused in the orifice O.

In addition to determining the surface roughness of test object it is also possible to determine the R.M.S. slope utilizing the instrument just described. The R.M.S. slope can be measured by varying the size of the aperture of the field stop F and observing the change in the measured relative reflectance.

It is also possible to determine the nominal height distribution function from relative reflectance measurements. The nominal height distribution function may be obtained by taking the Fourier transform of the square root of the relative reflectance function. This method is more fully explained in recent publications by Drs. H. E. Bennett and J. O. Porteus, Journal of the Optical Society of America, vol 51, page 1477, published 1961; and Journal of the Optical Society of America, in press; and, Dr. J. O. Porteus, Journal of the Optical Society of America, in press.

Therefore it is understood that in accordance with the above teaching that there has been provided a device which is capable of measuring surface roughness of flat or curved surfaces with precision. The device may be used by unskilled personnel to accurately and rapidly determine the R.M.S. surface roughness through a simple meter or counter.

Obviously many modifications and variations of the present invention are possible in the light of the above teachings. It is therefore to be understood that the scope of the appended claims the invention may be practiced otherwise than as specifically described.

What is claimed is:

1. A reflectometer comprising in combination:
    a point source image generating means for emitting continuous beams of light having wavelengths within the infrared region of the spectrum;
    an object support;
    means for converting said continuous light beams to pulsed beams;
    means, including a beam splitter having a light reflecting portion for directing said pulsed beams to impinge upon a given light reflecting surface of an obvious positioned on said support so that the pulsed light beams will be reflected from said surface to impinge on, and in turn, be reflected from the reflecting portion of the beam splitter;
    a light detector and electrical signal generating means displaced from said light reflecting portion of said beam splitter; and
    means for focusing the pulsed light beams, as they are reflected from said beam splitter, to impinge on said detector so that the pulsed light beams reflected from the surface of the object may be converted to electrical signals indicative of the roughness thereof.

2. The reflectometer as defined in claim 1 wherein said means for directing said pulsed beams to impinge on the surface of said object includes a first lens for aligning said pulsed beams in parallel fashion, and a second lens for focusing the pulsed light beams to impinge on a predetermined portion of the object.

3. The device as defined in claim 2 wherein said first and second lens, said beam splitter, and said means for focusing said light beams to impinge on said detector are formed of material containing calcium fluoride.

4. The device of claim 3 wherein said light detector and signal generating means comprises:
    a thermistor bolometer for converting pulsed infrared light beams to electrical output signals;
    an alternating current amplifier for amplifying said signals; and
    means for indicating the magnitude of said signals in their amplified form to thus provide a measurement of the roughness of the surface of said object.

5. The device of claim 1 wherein there is provided means to removably support a reference surface having a known value to provide a first roughness indication, an adjustable field stop disposed between said detector and said focusing means; and means, including a centering microscope and removable plane mirror, to insure that said surface of said object is so aligned with respect to said beam splitter as to provide for insuring that the image being reflected from the surface of said object coincides, with respect to said field stop, with the image reflected from said reference surface.

6. The device of claim 5 wherein there is provided an interference filter system for correcting intrinsic reflectance differences between the reflectance of said reference surface and the surface of said object.

7. A reflectometer comprising in combination:
    means for providing a source of infrared light beams;
    a beam collimating lens displaced from said source;
    a light chopper disposed between said source and said collimating lens for interrupting said beams prior to their being collimated at said lens;
    a beam splitter disposed adjacent said lens for receiving and passing interrupted light beams as they egress from said lens;
    means arranged adjacent said beam splitter for positioning a given surface of an object within the path of the interrupted light beams as they pass from said beam splitter in a manner which causes the interrupted light beams to be reflected from the surface of the object to impinge on a reflecting surface of the beam splitter;
    a light beam focusing lens so arranged adjacent the reflecting surface of said beam splitter so as to receive and pass light reflected therefrom;
    a field stop disposed adjacent said focusing lens; and
    a detector arranged adjacent said field stop, whereby the light beams emitted from said source are converted to pulsed beams by said light chopper and are caused to be reflected from the surface of the object to the detector to provide a detector output signal indicative of the surface-roughness of the object.

8. The device of claim 7 wherein means are provided to removably mount a roughness reference surface.

9. The device of claim 8 wherein there is provided a centering telescope and plane mirror so arranged adjacent the field stop as to provide means for visually aligning the given surface with respect to said field stop.

10. The device of claim 9 wherein there is provided means for correcting intrinsic reflectance differences between the reflectance of said reference surface and the given surface of said object.

11. A reflectometer comprising in combination:
    an infrared light source;
    a first light directing means for establishing and directing a flow of parallel pulsed light beams, having a wavelength within the infrared region of the light spectrum, along a given path;
    a removable reference mirror, having a predetermined surface roughness, displaced from said emitting and directing means and normally disposed within the path of said flow so that said beams may be reflected from its surface;

at least one object support arranged between said mirror and said emitting and directing means for selectively positioning an object between said mirror and said emitting and directing means so that the pulsed beams may be reflected from the surface thereof;

a second light beam directing means displaced from said object support and from said mirror for directing reflected pulsed light beams along a predetermined path;

a field stop for accepting the reflected light beams directed by said second directing means; and a light beam detector arranged adjacent said field stop and in the path of the pulsed light beams directed by said second source for providing signals indicative of the roughness of the surface from which the light is being caused to be reflected so that, in the absence of an object being supported by said object support, roughness readings may be made with respect to the surface roughness of said mirror and when an object is supported on said support roughness readings may be made with respect to the surface thereof in order that the two readings may be compared.

12. The device of claim 11 wherein the first light directing means comprises a light chopper, an infrared light passing beam splitter surface, and infrared light passing lenses, and wherein said second directing means comprises a light reflecting beam splitter surface, a pair of interference filters, and at least one infrared light beam focusing lens.

13. The device of claim 11 wherein a signal amplifying and voltage metering device are provided to process the detector's signals in order to measure roughness of the surface from which the light is being reflected.

References Cited by the Examiner

UNITED STATES PATENTS 2,803,161   8/57   Summerhayes.
2,938,424   5/60   Herriott.

OTHER REFERENCES

Relation Between Surface Roughness and Specular Reflectance at Normal Incidence, by Bennett et al., Journal of the Optical Society of America, vol. 51, No. 2, Feb. 1961; pp. 123 to 129.

RALPH G. NILSON, *Primary Examiner.*

JAMES W. LAWRENCE, *Examiner.*